US006439260B1

(12) United States Patent
Shuff

(10) Patent No.: US 6,439,260 B1
(45) Date of Patent: Aug. 27, 2002

(54) EASY TO USE RESIDENTIAL WATER SUPPLY SYSTEM FOR PREVENTING WINTER FLOOD DAMAGE

(76) Inventor: James Shuff, 42 Porter Rd., Freedom, NH (US) 03836

( * ) Notice: Subject to any disclaimer, the term of this patent is extended or adjusted under 35 U.S.C. 154(b) by 0 days.

(21) Appl. No.: 09/976,592

(22) Filed: Oct. 15, 2001

(51) Int. Cl.[7] ................................................ F16K 17/38
(52) U.S. Cl. ......................... 137/457; 137/62; 137/312; 137/79
(58) Field of Search ................................ 137/457, 312, 137/62, 79

(56) References Cited

U.S. PATENT DOCUMENTS 4,324,268 A * 4/1982 Jacobson .................... 137/312
4,730,637 A * 3/1988 White ......................... 137/62
4,944,253 A * 7/1990 Bellofatto ............... 137/312 X
5,113,892 A * 5/1992 Hull et al. .............. 137/312 X
5,638,847 A * 6/1997 Hoch, Jr. et al. ....... 137/312 X

* cited by examiner

*Primary Examiner*—Kevin Lee
(74) *Attorney, Agent, or Firm*—Robert Nathans

(57) ABSTRACT

Electrical control circuitry is provided for normally maintaining an electrically controlled water supply valve in an open condition and an electrically controlled water drain valve in a closed condition when a home is occupied and for arming the system by shutting off the water supply valve and for maintaining the water drain valve in an open condition. This action prevents pipe bursting and flooding, particularly during the winter, when a single manually operated conspicuously located switch is opened to arm the system upon departure from the home for an extended period. Should the home owner forget to arm the system, an electrical power interruption, which often can disable heating systems, causing pipe bursting and flooding, will automatically arm the system upon a power failure and the supply valve remains shut and the drain valve remains open until the homeowner returns and resets the system with a pushbutton switch.

19 Claims, 2 Drawing Sheets

EASY TO USE RESIDENTIAL WATER SUPPLY SYSTEM FOR PREVENTING WINTER FLOOD DAMAGE

BACKGROUND OF THE INVENTION

The present invention relates to the field of water supply systems for buildings.

The problem of burst water supply pipes and flooding of buildings has been recognized in prior art patents. In U.S. Pat. No. 4,848,389 issued to Pirkle, the feature of providing electrical control to shut off the water main supply with a first valve and draining the pipes in a building with a second valve in a TEE joint, to prevent freezing and bursting of the pipes is disclosed. These actions can be in response to thermostat sensing of potentially freezing temperatures. See also White, U.S. Pat. No. 4,730,637 in col. 7 and its abstract. The prior art also teaches sensing whether the pipes were freezing and then draining them. It is desired to provide a relatively simple, rugged inexpensive system for performing the above described function in a residential home, which need not employ relatively complex systems such as those using thermostats, or those using sensors to detect freezing, and that any homeowner could operate merely by actuating a single conspicuously located switch away from the intimidating electrical control panel upon departing from the home for an extended period of time, particularly during the winter months. It is also desired to provide a system that reduces damage due to heat failure triggered by power outages and that is not affected adversely by power surges which are commonplace in many areas.

SUMMARY OF A PREFERRED EMBODIMENT OF THE INVENTION

A single master switch easily actuated by an unskilled homeowner positioned at the top of the cellar stairs for example, controls a master relay, which in turn causes a solenoid actuated water supply valve to remain open and a solenoid actuated drain valve to remain closed. When the homeowner leaves the home for an extended period, the master switch in the lower winter mode position is opened to arm the system and de-energize the master relay to in turn shut off the water supply valve and open the drain valve in the TEE joint to drain water from the pipes throughout the house. Upon returning home, the master switch is closed, a reset button is pressed, and the master relay is again energized to close the drain valve and open the main water supply valve. The master relay can also shut off the water heater, and the water pump if present, during the extended absence of the homeowner, thus saving on fuel bills. Since the pipes are drained, there is less of a need to keep the water heater operating to deter freezing of the pipes which could otherwise burst.

However, should the homeowner forget to arm the system by opening the master switch when its "on" switch position is in the lower "winter" mode, the pipes could freeze and burst requiring expensive pipe replacement and repair of the home due to flooding damage. This damage is often caused by an electrical power interruption which could shut down the heating system hastening an expensive pipe burst freeze-up condition. Electrical heating systems and certain electrically actuated heating plants are particularly susceptible. An important feature of the invention is to sense the power interruption, however brief, and cause the system to be enabled or armed just as if the homeowner had remembered to open the master switch upon leaving the home for the extended period. Optionally, a timer may be desired to eliminate the enabling effect of extremely brief power interruptions. The power interruption de-energizes the master relay to shut off the main water supply and drain the system for an extended period until the home owner returns and presses a reset button to restore normal operation. This involves the fail-safe re-energization of the relay only upon homeowner operation of the reset button upon his return, and restoration of power during his absence will not re-energize the master relay as its latching circuit remains disabled. The use of relatively complex thermostats for controlling the master relay can thus be avoided. Also, straightforward use of thermostats could turn the supply and drain valve on and off several times during temperature fluctuation cycles, in contrast with the fail safe feature of the invention, which in turn could drastically increase flooding, caused by the drain valve opening several times, to greatly increase water damage. If the valves open and close several times with the power going off and on, not only would the cellar flood, more damage could occur in the interior of the house, if there had been a freeze in a pocket of water in the interior living portion of the house.

The simple switch/master relay arrangement of the invention is useful even where freezing is not a threat and particularly where a second home is abandoned for an extended period. Pipe bursting flooding, not caused by freezing, is prevented. Also, vandals could open water valves in the home producing flooding. An optional "non-winter" mode position of the master switch can be used to bypass the failsafe feature to turn the master relay on and off during each power interruption. The "always on" or "non-winter" upper master switch "on" position can be used when the freezing concern is not present. If there is a power failure, the system would automatically reset without having to push the reset button. If people were to have an automatic sprinkler for their lawn or garden for example, they might want to leave the water on during the week and would want to negate the requirement to push the reset button.

BRIEF DESCRIPTION OF THE DRAWINGS

These and other features of the invention will become more apparent upon study of the following description taken in conjunction with the drawings in which.

DETAILED DESCRIPTION OF A PREFERRED EMBODIMENT OF THE INVENTION

Figure 1:
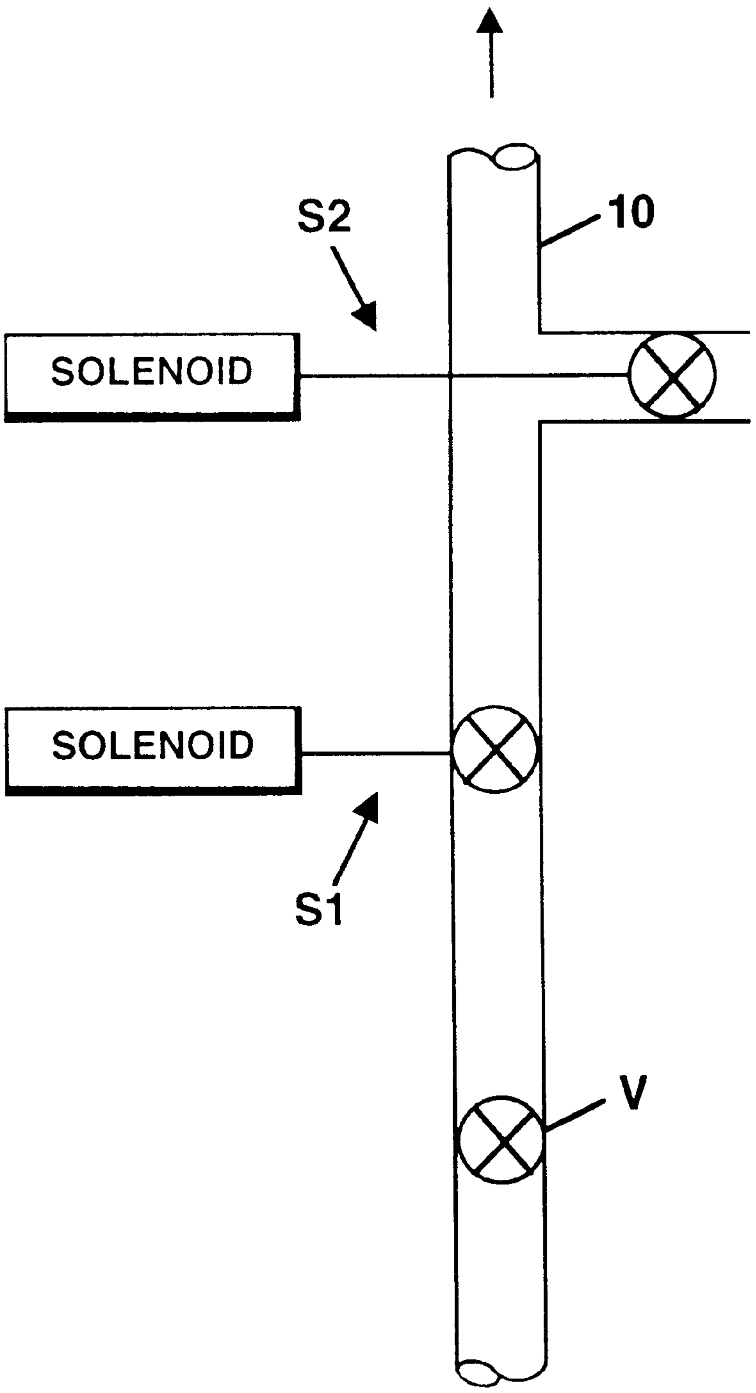
FIG. 1 illustrates placement of the solenoid actuated valves in the water supply piping.

As indicated in FIG. 1, water shutoff valve V normally supplies water which flows through solenoid actuated water supply valve S1, through the TEE adjacent the solenoid actuated drain valve S2 and through water line 10 supplying water to the home. See also, the upper left hand portion of FIG. 2. The S2 valve is coupled to the other side of the TEE to allow water to drain when S2 is open and and valve S1 is closed. As described below, these valves operate in "push-pull" or "see-saw" fashion so that when the main supply valve S1 turns off to block water flow into the house when the system is armed by the home owner upon departure, the drain valve S2 will drain the water lines 10 throughout the house, at least to a substantial degree; opening a bathroom sink valve can help drain the system. If possible, the drain valve can introduce water being drained right to a cellar sump pump via a hose.

Figure 2:
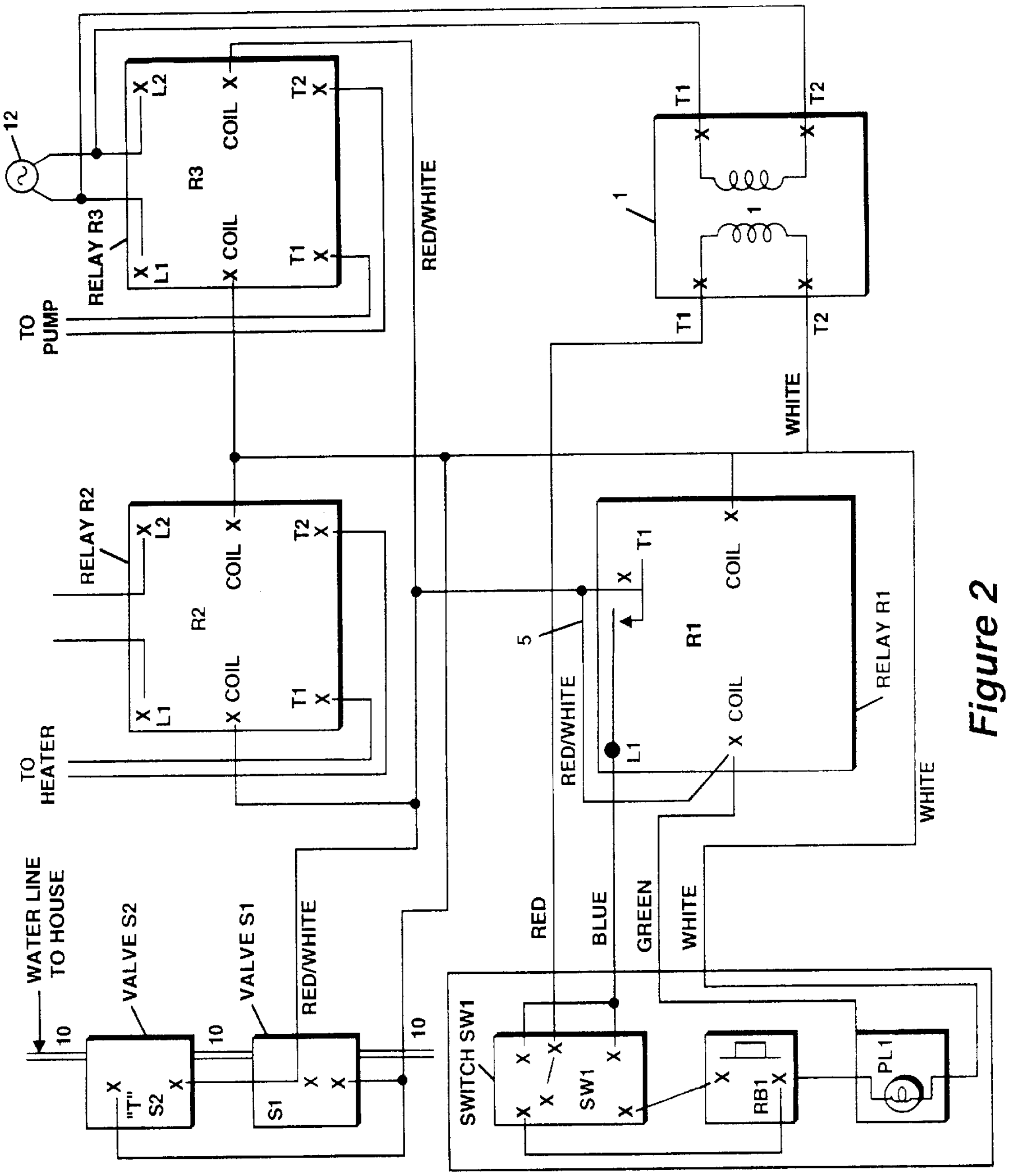
FIG. 2 illustrates detains of the electrical controls of the kit of the present invention.

The system is presently intended to be supplied as a kit so that the main leads are color coded and thus these colors will be used in the FIG. 2 description for convenience and clarity, even though the patent drawings are in black and white. R1 is a single pole 24 volt master relay whose contacts are opened when the relay is unenergized and R2 and R3 are two pole 24 volt relays. As shown in FIG. 2, master switch 6, is a double pole double throw switch (on-off-on) that receives its power from a 24 volt AC transformer (1) via the red wire. By putting a jumper wire across the middle two terminals on this switch, power is supplied to both sides of switch. When the switch is in the upper "on" position, power is supplied to the relay coil on the single pole primary or master relay R1, by the green wire and power to terminal L1 by the blue wire. When this relay's R1 contacts are closed upon energization of the coil, power is supplied to the coils of relays R2 and R3 through the red/white wire connected to terminal T2 on R1. When the contacts of Relay R2 close, which are normally open, the circuit is completed via the white ground wire for the current to flow to the water heater, L1 & L2 are the electric lines from the circuit breaker in the main panel, and T1 & T2 are the lines to the water heater. When the contacts on Relay R3 close, which are normally open, the circuit is completed for the electricity to flow to the water pump.

The wire from the circuit breaker in the main panel for the water pump is connected to Li & L2 and T1 and T2 are the lines to the pump. Connecting the input power leads on the transformer, to terminals Li & L2 of relay R3, or R2 if no pump is present, creates the power transformer source. AC source is coupled to the transformer 1 and to relay R3 as shown.

Solenoid actuated Valve S1, normally closed when not energized, in the water line is opened by the power supplied by the red/white wire allowing the water to flow in the pipes. As S1 is opening, solenoid actuated drain valve S2, normally open and attached to a tee in the water pipe (10) shown in FIG. 1, between S1 and the house, is closed by power from the same red/white wire. When the system is de-energized upon a power failure, S1 is closed and S2 is opened which beneficially stops the flow of water into the home and allows water to drain from the pipes. With the throw of one switch, the hot water heater and water pump, if present, are turned on, the solenoid actuated supply valve S1 opens and the solenoid actuated drain valve closes. The pilot light PL1 indicates that the water heater and pump are on and the water is flowing to supply the house. The white wiring through out the drawing is the other leg of the 24-volt circuits and is connected to the transformer at (T2).

The other "on" or lower position of the double pole toggle master switch 6 enables the "winter" mode. This position of the switch directs the power of the green line through a reset button which, because of a jumper or relay latch wire J on the master relay terminal T1, will create a fail safe system. With the switch in the "winter" position, the reset button has to be pushed to close the contacts on Relay R1. If the power should go off while the switch is in this "winter" position, the system will not reset itself, as in the upper or non-winter "on" position of master switch 6. The reset button RB1 would have to be pushed in order to re-energize and close the relays R1, R2 & R3 controlling the power to the water heater, pump and valve solenoids. The pilot light again indicates that the water heater and pump are on and that the water is following into the house and that the drain is closed. When the switch is in the "winter" position and the power goes off, the pilot light would remain extinguished until the reset button is pushed by the returning homeowner.

Thus, should the homeowner forget to arm the system by opening master switch 2, the aforesaid opening of master switch 2 is mimicked upon a power failure which is like opening the master switch, and beneficially the R1 remains de-energized and thus the drain is actuated and the water supply main remains closed to prevent flooding in the event of frozen pipes until the return of the homeowner who actuates reset button 12 to return the system to normal.

Utilizing a jumper wire (blue) across the two end terminals on one side of SW1 and attaching the blue wire from Li on R1 to one of these terminals, allows the system to be In the shut down mode completely in the "off" position.

It should now be appreciated that a first electrical control means is provided including master relay R1, solenoid actuated valves S1 and S2, for maintaining the electrically controlled water supply valve in an open condition and the electrically controlled water drain valve in a closed condition while the first electrical control means is in a first state (relay R1 energized) and for shutting off the water supply valve while maintaining the water drain valve in an open condition when the first electrical control means is in a second state(relay R1 de-energized) and a manually operated switch SW1 coupled to the first electrical control means for changing the states of said electrical control means upon manual actuation of said manually operated switch; a second electrical control means including relay R2 for turning a hot water heater off in response to said electrical control means assuming the second state along with a third electrical control means including relay R3 for turning a water pump off, if present, in response to the control means assuming the second state. Since variations in the above will readily occur to the skilled worker in the art, the scope of the invention is to be limited only by the terms of the following claims and art recognized equivalents thereof For example the term relay is intended to cover equivalent means such as a solid state current control device. It is possible although less desirable to mechanically link one solenoid plunger actuating the first valve to a second valve without providing a second solenoid.

I claim:

1. An electrically controlled water supply system for thwarting water damage in a structure caused by flooding comprising:

(a) an electrically controlled water supply valve and water drain valve positioned in a water supply conduit supplying water to said structure;

(b) electrical control means for maintaining said electrically controlled water supply valve in an open condition and said electrically controlled water drain valve in a closed condition while said electrical control means is in a first state and for shutting off said water supply valve and for maintaining said water drain valve in an open condition when said electrical control means is in a second state; and (c) a manually operated switch coupled to said electrical control means for changing said states of said electrical control means upon manual actuation of said manually operated switch; and (d) including a master relay for maintaining said water supply valve in an open position and said water drain valve in a closed position when said master relay remains energized.

2. The water supply system of claim 1 including de-energizing means for de-energizing said master relay upon an electrical power interruption in electricity supplied to said structure.

3. The water supply system of claim 2 including means for re-energizing said master relay upon actuation of a reset switch.

4. The water supply system of claim 3 wherein said reset switch comprises a normally open pushbutton switch.

5. The water supply system of claim 2 including de-energizing means for de-energizing said master relay only as long as said electrical power interruption exist.

6. The water supply system of claim 2 including means for re-energizing said master relay only upon actuation of a reset switch.

7. The water supply system of claim 6 wherein said reset switch comprises a normally open pushbutton switch.

8. An electrically controlled water supply system for thwarting water damage in a structure caused by flooding comprising:

(a) an electrically controlled water supply valve and water drain valve positioned in a water supply conduit supplying water to said structure;

(b) first electrical control means for maintaining said electrically controlled water supply valve in an open condition and said electrically controlled water drain valve in a closed condition while said electrical control means is in a first state and for shutting off said water supply valve and for maintaining said water drain valve in an open condition when said electrical control means is in a second state;

(c) a manually operated switch coupled to said electrical control means for changing said states of said electrical control means upon manual actuation of said manually operated switch; and (d) a second electrical control means for turning a hot water heater off in response to said electrical control means assuming said second state; and (e) including a master relay for maintaining said water supply valve in an open position and said water drain valve in a closed position when said master relay remains energized and for actuating said second electrical control means for causing said water heater to operate only while said master relay remains energized.

9. The water supply system of claim 8 including de-energizing means for de-energizing said master relay upon an electrical power interruption in electricity supplied to said structure.

10. The water supply system of claim 9 including means for re-energizing said master relay upon actuation of a reset switch.

11. The water supply system of claim 10 wherein said reset switch comprises a normally open pushbutton switch.

12. The water supply system of claim 8 including de-energizing means for de-energizing said master relay only as long as said electrical power interruption exist.

13. An electrically controlled water supply system for thwarting water damage in a structure caused by flooding comprising:

(a) an electrically controlled water supply valve and water drain valve positioned in a water supply conduit supplying water to said structure;

(b) first electrical control means for maintaining said electrically controlled water supply valve in an open condition and said electrically controlled water drain valve in a closed condition while said electrical control means is in a first state and for shutting off said water supply valve and for maintaining said water drain valve in an open condition when said electrical control means is in a second state;

(c) a manually operated switch coupled to said electrical control means for changing said states of said electrical control means upon manual actuation of said manually operated switch; and (d) a second electrical control means for turning a hot water heater off in response to said electrical control means assuming said second state; and (e) third electrical control means for turning a water pump off in response to said control means assuming said second state; and (f) including a master relay for maintaining said water supply valve in an open position and said water drain valve in a closed position when said master relay remains energized and for actuating said third electrical control means for causing said water pump to operate only while said master relay remains energized.

14. The water supply system of claim 13 including de-energizing means for de-energizing said master relay upon an electrical power interruption in electricity supplied to said structure.

15. The water supply system of claim 14 including means for re-energizing said master relay upon actuation of a reset switch.

16. The water supply system of claim 15 wherein said reset switch comprises a normally open pushbutton switch.

17. The water supply system of claim 1 wherein said manually operated switch is positioned at a conspicuous location within said structure apart from an electrical control panel.

18. The water supply system of claim 8 wherein said manually operated switch is positioned at a conspicuous location within said structure apart from an electrical control panel.

19. The water supply system of claim 13 wherein said manually operated switch is positioned at a conspicuous location within said structure apart from an electrical control panel.

* * * * *